May 27, 1930. J. F. P. GILLESPIE 1,760,749
STEERING GEAR
Filed Jan. 10, 1928
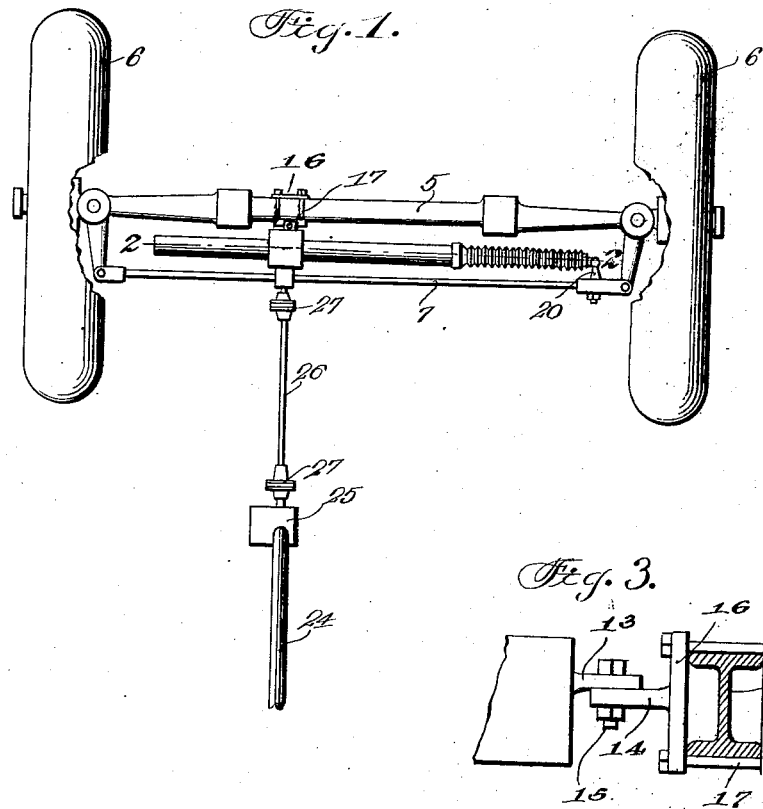
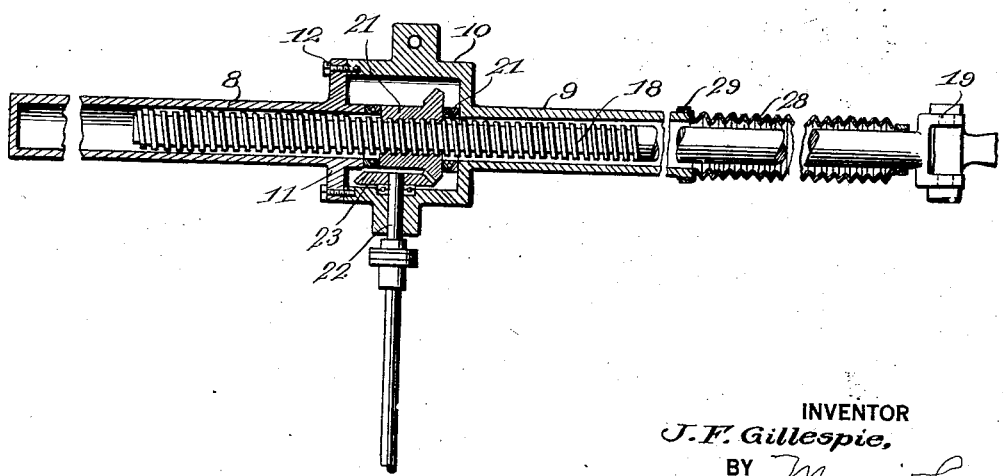
INVENTOR
J. F. Gillespie,
BY
ATTORNEY Patented May 27, 1930

1,760,749

UNITED STATES PATENT OFFICE

JOHN F. P. GILLESPIE, OF MONTGOMERY, ALABAMA

STEERING GEAR

Application filed January 10, 1928. Serial No. 245,761.

My invention relates to steering gears for motor vehicles.

An object of the invention is to provide a steering gear which will cause the steering wheels to hold their course even though the steering axle bolt may be sheered or the axle otherwise rendered defective.

Further the invention provides a steering gear mechanism whereby the steering wheels may be set in true alinement and thus increase the life of the tires with which the steering wheels are equipped and at the same time permit free and easy steering.

Another object of the invention resides in the provision of a steering gear wherein shocks or jars from the vehicle wheels are not transmitted to the usual steering wheel.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a top plan view of the invention associated with the conventional steering axle and wheels, parts of the latter being broken away;

Figure 2 is a longitudinal sectional view taken on line 2—2 of Figure 1; and

Figure 3 is an enlarged fragmentary detail view.

Referring to the invention in detail, a conventional front steering axle 5 having steering wheels 6 operatively connected together by a transversely shiftable steering gear rod 7, is provided.

Arranged longitudinally of the axle 5 in advance of the transversely shiftable steering gear rod 7 is a cylindrical casing embodying sections 8 and 9. At its inner end the section 9 is formed with a cylindrical gear casing 10 which is open at its inner end. The outer end of the section 8 is closed while a cover plate 11 for the gear casing is formed adjacent the inner end of this section, the cover plate being detachably held to the gear casing by removable fastenings 12.

For the purpose of supporting the two part casing, the gear housing 10 is formed with a laterally projecting lug 13 which is secured to a forwardly extending attaching plate 14 by means of a removable fastening 15, the plate 14 being formed with one of a pair of coacting clamps 16 embracing the opposite faces of the axle and held thereto by clamping bolts 17.

To shift the transversely shiftable steering gear rod to actuate the steering wheels 6, a threaded rod 18 is longitudinally movable within the casing and projects to a point adjacent to one of the steering wheels. At its outer end the threaded rod is formed with parallel ears 19 which are pivotally connected to a forwardly extending stud or knuckle 20 rigid with and projecting at right angles from one end of the rod 7.

An internally threaded bevelled gear 21, arranged within the gear housing 10 with its bore in longitudinal alinement with the casing sections 8 and 9, receives the threaded rod 18. Thrust bearings 21 received on the threaded rod are interposed between the ends of the gear 21 and casing sections to retain this gear against longitudinal displacement. Keyed to a short shaft 22, extending through the gear housing 10 at right angles to the threaded rod 18, is a bevelled gear 23 meshing with the internally threaded gear 21. The usual steering shaft 24, passing through a gear box 25, is operatively connected with the short shaft 22 through the medium of a shaft 26 whose ends are connected to the shafts 22 and 24 by universal couplings 27.

To protect the projecting end of the threaded rod 18 against dirt and other foreign matter, a cylindrical pleated protective housing 28 is received thereon. This protective housing extends from the outer end of the threaded rod to the adjacent end of the casing section 9 and is secured to the latter and to the threaded rod by clamping bands 29.

In the operation of the invention the internally threaded gear 21 is rotated by manipulation of the steering wheel, not shown, attached to the steering shaft. Incident to the rotation of the internally threaded gear responsive to the rotation of the shaft 24, the threaded rod will be fed longitudinally to the right or left according to the direction of rotation of the shaft 24 to correspondingly shift the transversely shiftable steering gear rod 7.

What is claimed is:—

In combination, a two part cylindrical casing to be attached to a steering axle and arranged in a horizontal plane, a gear housing formed in one end of one of the casing sections and having one end open, a cover plate formed with the other section and closing the open end of the gear housing, a longitudinally shiftable screw passing through the casing and gear housing, and having one end adaptable to be attached to the transversely shiftable rod of the steering gear mechanism, an internally threaded gear received on the screw and held between the cover plate and opposite wall of the gear housing, and a second gear supported within the gear housing and meshing with the internally threaded gear.

Signed at Montgomery in the county of Montgomery and State of Alabama this 5th day of January A. D. 1928.

JOHN F. P. GILLESPIE.